United States Patent [19]

Lau et al.

[11] Patent Number: 5,048,234
[45] Date of Patent: Sep. 17, 1991

[54] ENERGY ABSORBING MODULAR DOOR

[75] Inventors: Ian V. Lau, Troy; Jeffrey A. Welch, St. Clair Shores, both of Mich.

[73] Assignee: General Motors Corporation, Detroit, Mich.

[21] Appl. No.: 633,629

[22] Filed: Dec. 24, 1990

[51] Int. Cl.$^5$ ................................................ B60J 5/04
[52] U.S. Cl. ..................................... 49/502; 296/146; 296/189
[58] Field of Search .................... 49/502; 296/146, 189

[56]  References Cited

U.S. PATENT DOCUMENTS

| | | | |
|---|---|---|---|
| 2,658,790 | 5/1953 | Fish et al. | 296/44 |
| 2,707,320 | 5/1955 | Fish | 29/152 |
| 4,428,157 | 1/1984 | Engelsberger et al. | 49/502 |
| 4,648,208 | 3/1987 | Baldamus et al. | 49/502 |
| 4,783,114 | 11/1988 | Welch | 296/153 |
| 4,785,585 | 11/1988 | Grier et al. | 49/502 |

FOREIGN PATENT DOCUMENTS 1267116  4/1968  Fed. Rep. of Germany .

Primary Examiner—Philip C. Kannan
Attorney, Agent, or Firm—Charles E. Leahy

[57]    ABSTRACT

A door inner panel and a door outer panel attached together in spaced apart relation defining a cavity. The door inner panel has an opening therein and the door components such as the window regulator and door handles are mounted on the module panel. A plurality of energy absorbing devices extended between the module panel and the door inner panel to effectively mount the module panel within the opening of the door inner panel. The energy absorbing devices yield upon the imposition of an occupant thereagainst to enable energy absorbing movement of the module panel and the door components into the cavity space between the inner and outer panels. The energy absorbing devices are preferably comprised of stamped steel straps having convolutions therein with one end of the strap welded to the module panel and the other end bolted to the door inner panel.

4 Claims, 2 Drawing Sheets

5,048,234

ENERGY ABSORBING MODULAR DOOR

The invention relates to a vehicle door having a module which carries the door components and is mounted on the door by a plurality of yieldable corrugated straps which absorb energy upon impact against the door.

BACKGROUND OF THE INVENTION

It is well known to provide a vehicle door comprised of an outer panel and inner panel which are attached together in spaced apart relation defining a cavity in which door operating components such as window regulators, latches, handles, etc., are mounted. It is also well known to mount these door components on a module panel which is subsequently bolted to the door inner panel. In this way, the module panel with the door components may be produced and assembled at a location remote from the vehicle assembly plant and tested and inspected before assembly into the vehicle door.

The present invention relates to a new and improved vehicle door construction in which a plurality of yieldable energy absorbing devices are employed to attach a door component module panel on the vehicle door inner panel so that the module panel is permitted to move laterally relative the door upon energy absorbing yielding of the energy absorbing devices.

SUMMARY OF THE INVENTION

A vehicle door is comprised of a door inner panel and a door outer panel attached together in spaced apart relation defining a cavity. The door inner panel has an opening therein and the door components such as the window regulator and door handle are mounted on the module panel. A plurality of energy absorbing devices extend between the module panel and the door inner panel to effectively mount the module panel within the opening of the door inner panel. The energy absorbing devices yield upon the imposition of an occupant thereagainst to enable energy absorbing movement of the module panel and the door components into the cavity space between the inner and outer panels. The energy absorbing devices are preferably comprised of stamped steel straps having convolutions therein with one end of the strap welded to the module panel and the other end bolted to the door inner panel.

Accordingly, the object, feature and advantage of the invention resides in the mounting of a door module panel within an opening of the door inner panel via energy absorbing devices which enable energy absorbing movement of the module panel into the door cavity upon imposition of an occupant thereagainst.

A further object, feature and advantage of the invention resides in the provision of convoluted straps mounting a module panel on a vehicle door inner panel with the convolutions yielding upon imposition of an occupant force there against to absorb energy and permit the module panel and components to move into the cavity space between the door inner and door outer panels.

BRIEF DESCRIPTION OF THE DRAWINGS

These and other features, objects and advantages of the invention will become apparent upon consideration of the description of the preferred embodiment and the appended drawings in which.

DESCRIPTION OF THE PREFERRED EMBODIMENT

Figure 1:
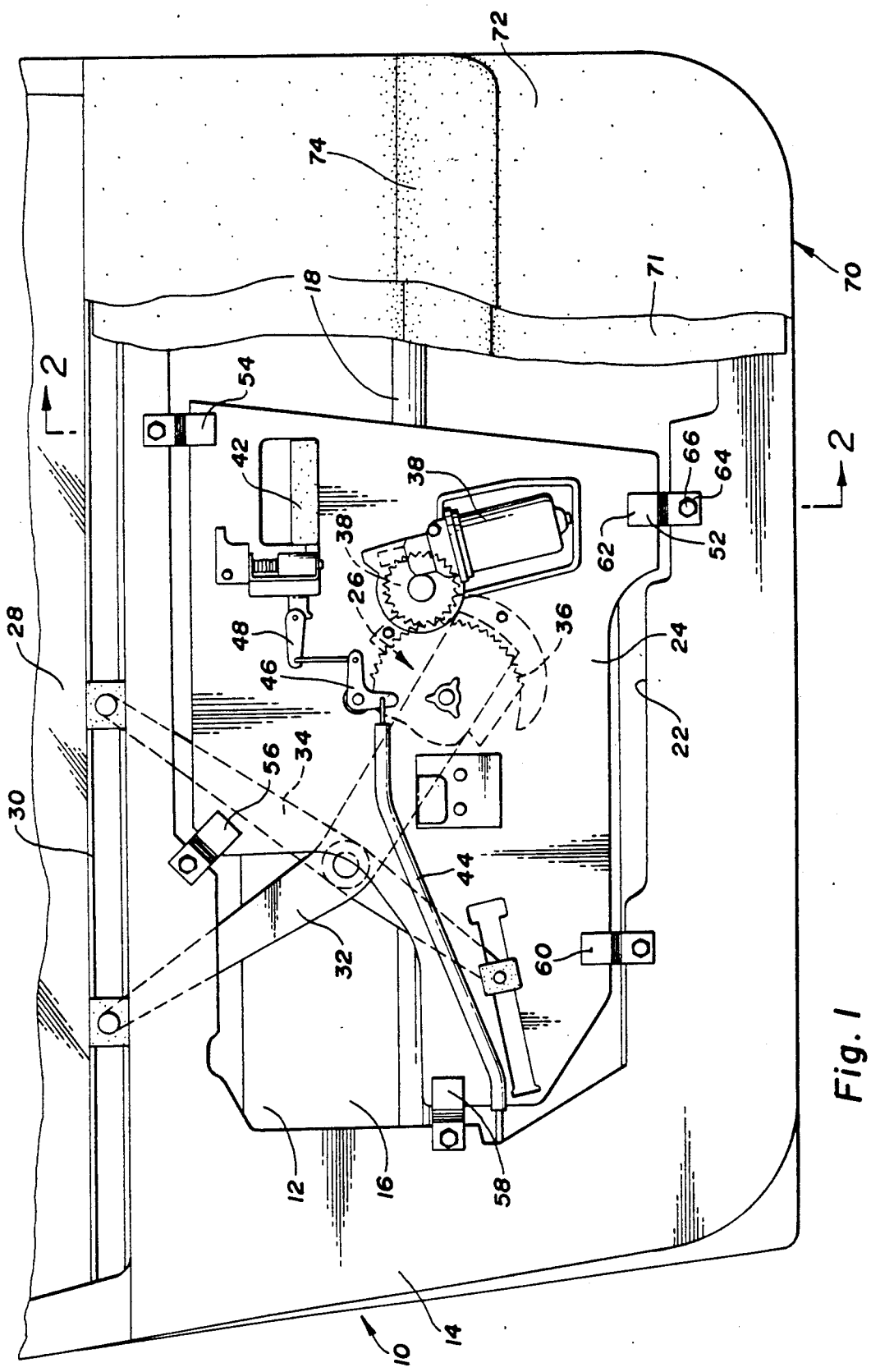
FIG. 1 a side elevation view of a vehicle door having parts broken away and in section to show the energy absorbing module of this invention.
Figure 2:
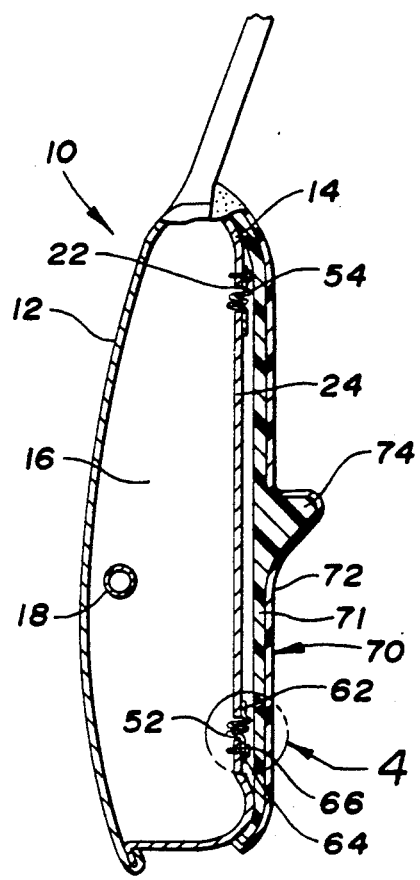
FIG. 2 is a sectional view taken in the direction of arrows 2—2 of FIG. 1 and having parts broken away and in section to schematically show the energy absorbing module of this invention.

Referring to FIGS. 1 and 2, it is seen that a vehicle door 10 is comprised of door outer panel 12 and a door inner panel 14 which are suitably joined together and spaced apart from one another to define a door cavity 16. An impact beam 18 comprised of a tube extends longitudinally within the door adjacent the outer panel 12.

As best seen in FIG. 1, the door inner panel 14 has a substantial opening 22 therein, in which a module panel 24 is mounted. The module panel 24 carries door components such as a window regulator assembly 26 which is connected to a window 28 by a sash channel 30 and regulator arms 32 and 34. A sector gear 36 carried by regulator arm 32 is driven by a motorized gear drive 38 to raise and lower the window 28. The module panel 24 also carries an inside door handle assembly 42 which is connected to a door latch, not shown, by control rod 44 and crank levers 46 and 48. The module panel 24 together with the door components mounted thereon comprise a modular door panel which is well known in the prior art and may be assembled and tested at a location remote from the vehicle assembly plant.

Figure 4:
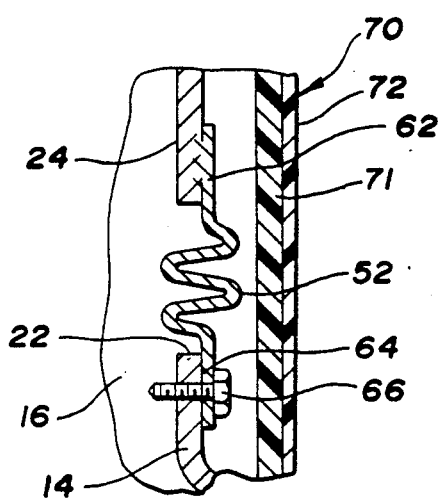
FIG. 4 is a enlarged fragmentary view of FIG. 2 showing the convoluted energy absorbing straps.

The module panel 24 is attached to the door inner panel 14 by a plurality of energy absorbing devices 52, 54, 56, 58, and 60. As best seen in FIG. 4, the energy absorbing device 52 is comprised of a metal strap having one end 62 thereof welded to the module panel 24 and the other end 64 thereof attached to the door inner panel 14 by a bolt 66. The energy absorbing devices 54, 56, 58 and 60 are similarly constructed.

Referring again to FIG. 1, it is seen that the energy absorbing straps 52, 54, 56, 58, and 60 are spaced around the module panel 24 to thereby provide substantially rigid connection of the module panel 24 to the door inner panel 14. As seen in FIGS. 1 and 2 a trim panel 70 is mounted on the inside of the door inner panel 14 and is constructed of a rigid molded plastic substrate panel 71 covered by a trim sheet 72 of cloth, vinyl or leather. A suitable arm rest structure 74 is suitably formed or mounted on the trim panel 70 or the module panel 24.

Figure 3:
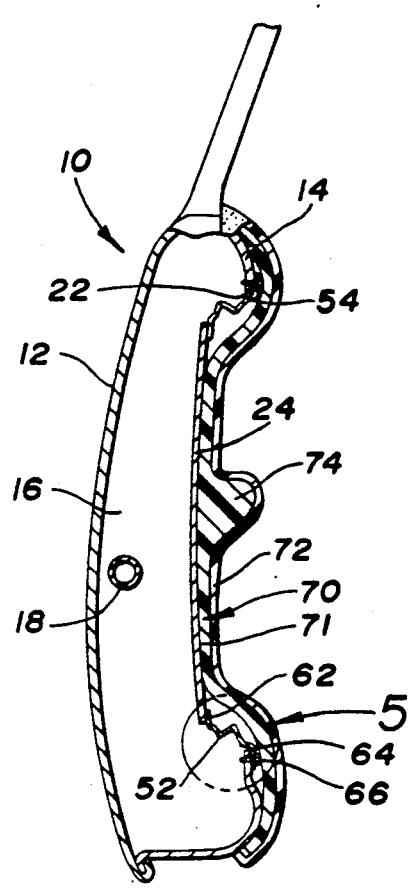
FIG. 3 is a view similar to FIG. 2 but showing the movement of the module panel into the space between the door inner and outer panels as permitted by the energy absorbing yielding of the convoluted straps.
Figure 5:
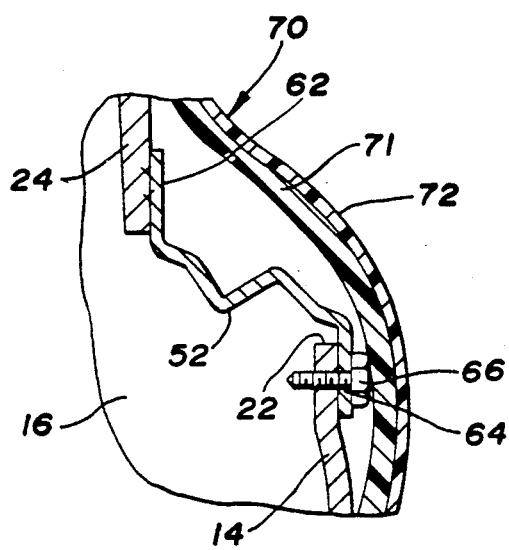
FIG. 5 is a enlarged fragmentary view of FIG. 3 showing the deformed energy absorbing strap.

As best seen in FIGS. 3 and 5, the imposition of an occupant load of predetermined force against the door will cause the module panel 24 to move into the door cavity 16 as permitted by plastic yielding deformation of the corrugations of the energy absorbing straps.

It will be understood that the door can be readily designed to provide controlled energy absorbing movement of the module panel 24. For example, the location and number of energy absorbing straps can be varied, as well as the thickness, width, size and number of convolutions provided in the straps. In addition, the module panel 24 may be configured to be smaller in size than the opening 22 of the inner panel 14 as shown in FIG. 1, or alternatively the module panel 24 can have localized portions which overlap onto the module panel 24 so that the module panel 24 and/or the inner panel 14 will also yield to permit the passage of the module panel 24 into the door cavity 16.

Thus it is seen that the invention provides a new and improved vehicle door construction in which a module panel mounting door components is mounted on the door via energy absorbing devices by which the module panel may collapse into the cavity upon imposition of an occupant thereagainst.

The embodiments of the invention in which an exclusive property or privilege is claimed are defined as follows:

1. A vehicle door comprising:
    a door inner panel and door outer panel attached together to form a door hingedly mounted on the vehicle body, said inner panel having an opening therein,
    a module panel having door components mounted thereon and adapted for mounting in the inner panel within the opening of the inner panel,
    and a plurality of energy absorbing means extending between the module panel and the door inner panel to effectively mount the module panel on the door and enable energy absorbing movement of the module panel relative to the door upon impact of the occupant against the door.

2. A vehicle door comprising:
    a door inner panel and door outer panel attached together in spaced apart relation to form a cavity within the door, said inner panel having an opening therein,
    a module panel having door components mounted thereon and adapted for mounting within the opening in the inner panel to thereby mount the door components on the door,
    and a plurality of energy absorbing means extending between the module panel and the door inner panel to effectively mount the module panel on the door, said energy absorbing means being operable upon the imposition of an occupant thereagainst to enable energy absorbing movement of the module panel and the door components into the cavity space between the inner panel and the outer panel.

3. A vehicle door comprising:
    a door inner panel and door outer panel attached together in spaced apart relation to form a door hingedly mounted on the vehicle body, said inner panel having an opening therein,
    a module panel having door components mounted thereon and adapted for mounting within the opening in the inner panel to thereby mount the door components on the door,
    and a plurality of yieldable straps extending between the module panel and the door inner panel to effectively mount the module panel on the door, said yieldable straps yielding upon the imposition of an occupant thereagainst to enable energy absorbing movement of the module panel and the door components into the space between the inner panel and the outer panel.

4. The combination of claim 3 in which said yieldable straps have convolutions formed therein by which the yieldable straps are extended in length by plastic deformation of said convolutions.

* * * * *